(12) United States Patent
Matsuda et al.

(10) Patent No.: US 8,089,573 B2
(45) Date of Patent: Jan. 3, 2012

(54) LIQUID CRYSTAL PANEL, LIQUID CRYSTAL DISPLAY APPARATUS AND TELEVISION RECEIVER

(75) Inventors: Masahiro Matsuda, Osaka (JP); Masanori Takeuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 264 days.

(21) Appl. No.: 12/523,185

(22) PCT Filed: Jan. 11, 2008

(86) PCT No.: PCT/JP2008/050260
§ 371 (c)(1),
(2), (4) Date: Jul. 15, 2009

(87) PCT Pub. No.: WO2008/087899
PCT Pub. Date: Jul. 24, 2008

(65) Prior Publication Data
US 2010/0053459 A1 Mar. 4, 2010

(30) Foreign Application Priority Data
Jan. 15, 2007 (JP) .................................. 2007-006278

(51) Int. Cl.
*G02F 1/1333* (2006.01)
(52) U.S. Cl. ................................ 349/40; 349/39; 349/54
(58) Field of Classification Search .................... 349/40, 349/54, 55
See application file for complete search history.

(56) References Cited

U.S. PATENT DOCUMENTS

| 6,108,057 A | 8/2000 | Kusanagi |
| 2001/0045998 A1 | 11/2001 | Nagata et al. |
| 2006/0012729 A1 | 1/2006 | Tanaka et al. |

FOREIGN PATENT DOCUMENTS

| JP | 9-152620 A | 6/1997 |
| JP | 2005-234492 A | 9/2005 |

OTHER PUBLICATIONS

International Search Report and English translation thereof mailed Apr. 1, 2008 in corresponding PCT application PCT/JP2008/050260.

*Primary Examiner* — Richard Kim
(74) *Attorney, Agent, or Firm* — Nixon & Vanderhye P.C.

(57) ABSTRACT

A liquid crystal panel (10) includes an active matrix substrate on which a transistor (12), a pixel electrode (17), signal lines (15, 16) and backup wirings (8*a*, 8*b*) for recovering a defect in the signal line are formed; a color filter substrate on which a common electrode (counter electrode) is formed; and a liquid crystal material provided between the active matrix substrate and the color filter substrate. The backup wirings (8*a*, 8*b*) are (electrically) connected to the common electrode on the color filter substrate, through (i) a protection circuit (9) for discharging an undesired electric charge that occurs in the backup wirings (8*a*, 8*b*) and (ii) a sealing adhesive (6). With this configuration, it becomes possible to reduce problems (for instance, unexpected short-circuiting of the backup wiring and the signal line) caused by the undesired electric charge that occurs in the backup wirings.

17 Claims, 10 Drawing Sheets

LIQUID CRYSTAL PANEL, LIQUID CRYSTAL DISPLAY APPARATUS AND TELEVISION RECEIVER

This application is the U.S. national phase of International Application No. PCT/JP2008/050260 filed 11 Jan. 2008, which designated the U.S. and claims priority to Japan Application No. 2007-006278 filed 15 Jan. 2007, the entire contents of each of which are hereby incorporated by reference.

TECHNICAL FIELD

The present invention relates to a backup wiring provided in a liquid crystal panel.

BACKGROUND ART

Figure 9:
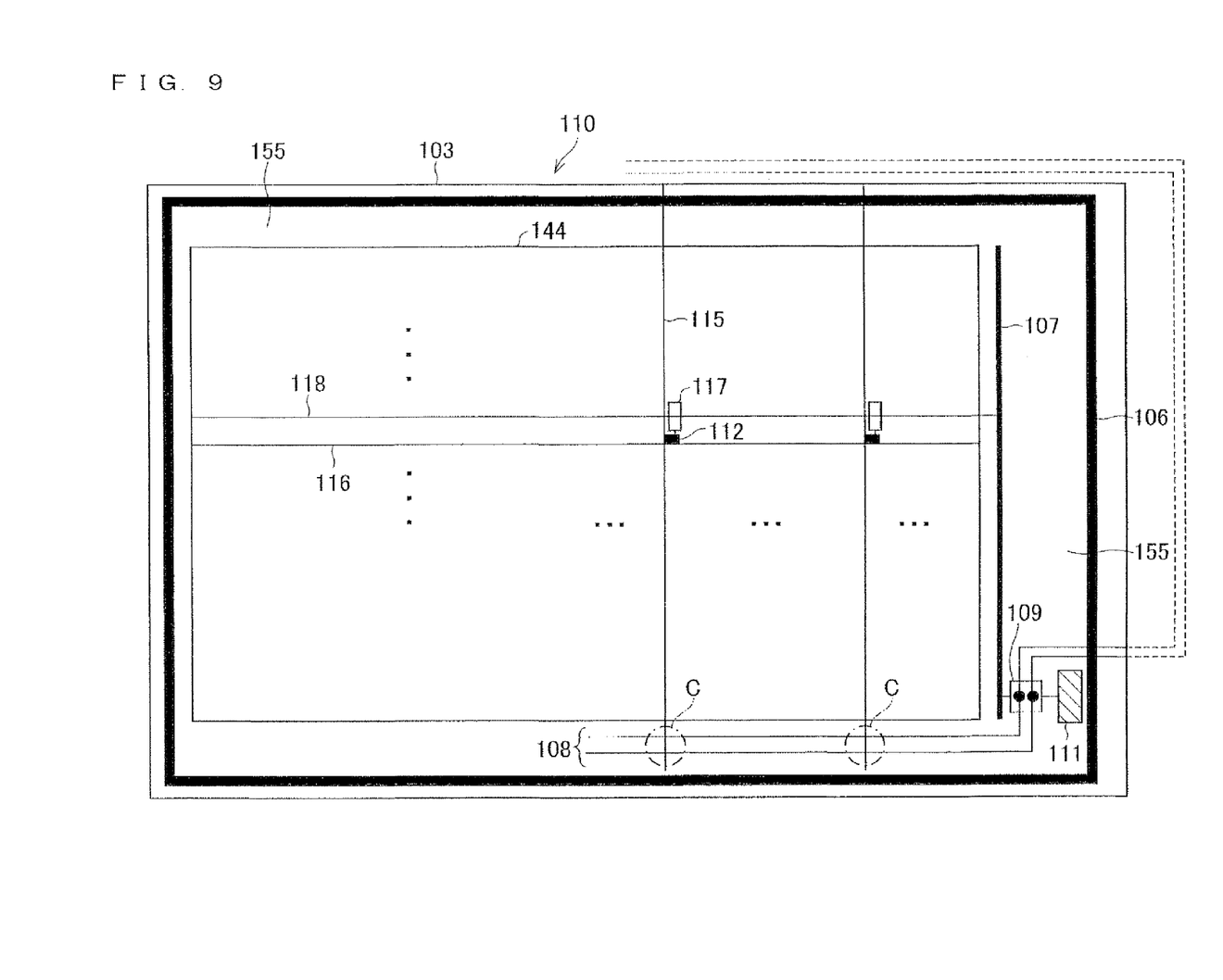
FIG. 9 is a see-through plan view illustrating a configuration of a conventional liquid crystal panel.

FIG. 9 is a plan view illustrating a configuration of a conventional liquid crystal display. As shown in FIG. 9, a liquid crystal panel 110 includes: an active matrix substrate 103; a color filter substrate (not illustrated); a sealing adhesive 106 for bonding the active matrix substrate 103 and the color filter substrate; and a liquid crystal material (not illustrated) that fills a space enclosed by the active matrix substrate 103, the color filter substrate, and the sealing adhesive 106.

The active matrix substrate 103 includes: a plurality of scanning signal lines 116 and a plurality of data signal lines 115 which are arranged crisscross; a TFT 112 (Thin Film Transistor) formed in the vicinity of each intersection of the signal lines (115, 116); and a pixel electrode 117. The TFT 112 has: a gate electrode that is connected to a scanning signal line 116; a source electrode that is connected to a data signal line 115; and a drain electrode that is connected to the pixel electrode 117. Further, on the color filter which is not illustrated, a common electrode is formed so as to be opposed to the pixel electrode 117 via the liquid crystal material.

In the liquid crystal panel 110, a data signal (signal potential) having been transmitted to the data signal line 115 is written to the pixel electrode 117 through the TFT 112. This causes a potential difference between the pixel electrode 117 and the common electrode (on the color filter substrate). This potential difference controls an optical transmittance of the liquid crystal material.

A retention capacitor wiring (Cs wiring) 118 has such functions as (i) preventing self-discharge of the liquid crystal material during an off period of the TFT 112 and (ii) providing each pixel with a modulation signal. The retention capacitor wiring 118 is connected to a major retention capacitor wiring 107 in a nondisplay area 155.

As shown in FIG. 9, backup wirings 108 run from the vicinity of (on an inner side of) one side (a side along the scanning signal line 116) that forms an outside edge of the liquid crystal panel 110 and extend, through an external substrate or the like, up to positions on an outer side of another side (another side along the scanning signal line 116) opposite to the aforesaid one side. The backup wirings 108 are used for recovering disconnection or the like of, for example, the data signal line 115.

Figure 10:
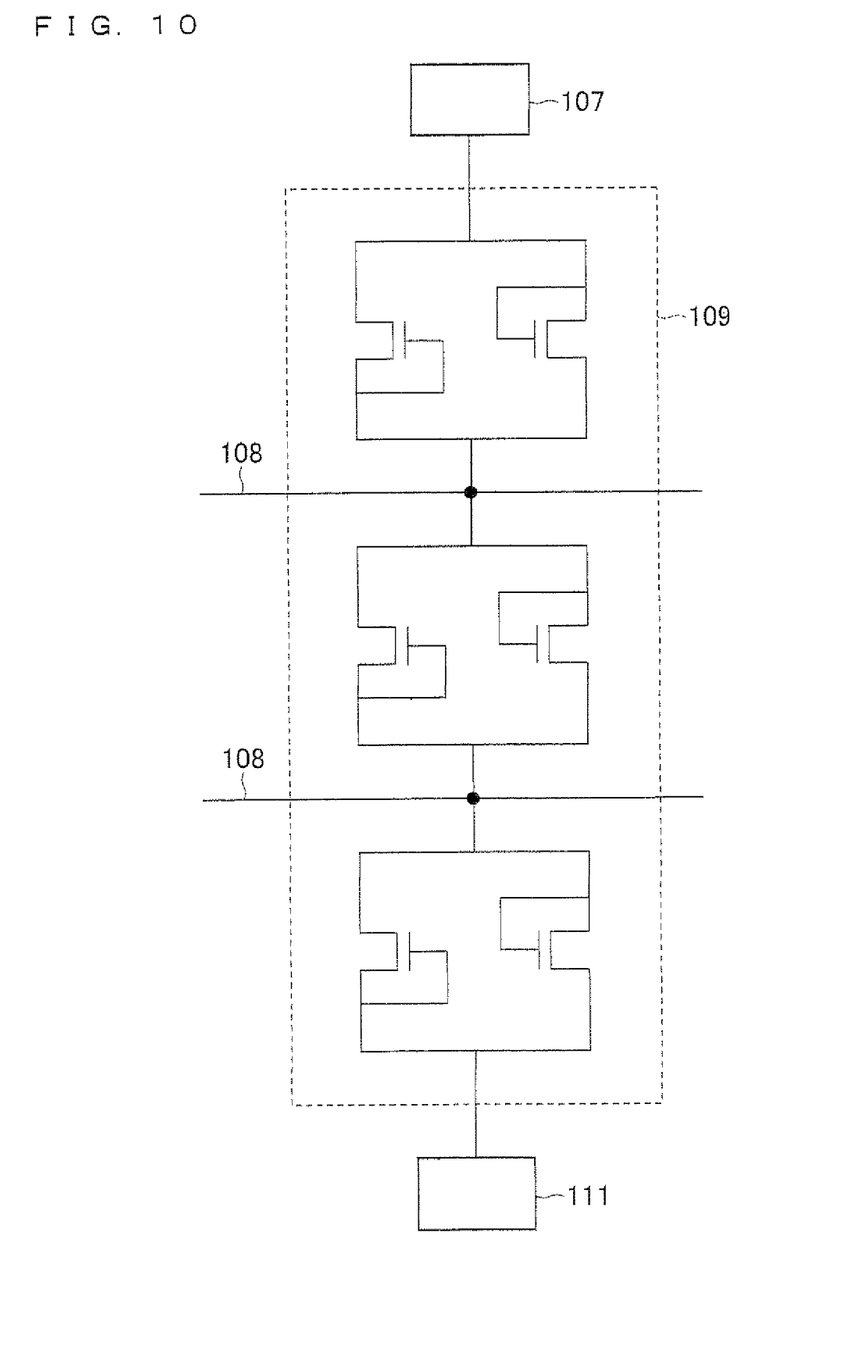
FIG. 10 is a circuit diagram illustrating a configuration of a protection circuit of the conventional liquid crystal panel.

If an undesired large electric charge occurs in the backup wiring due to static electricity or the like, a failure in wiring (e.g., short-circuiting of the backup wiring 108 and the data signal line 115) may occur, for example, at an intersection C of the backup wiring 108 and the data signal line 115. To counter this problem, as shown in FIG. 10, the liquid crystal panel 110 has such a configuration that the backup wirings 108 are connected, through a protection circuit 109, to the major retention capacitor wiring 107 and to a floating island electrode 111 (a light blocking metal in the nondisplay area 155) (refer to Patent Literature 1).

CITATION LIST

Patent Literature 1
Japanese Patent Application Publication, Tokukaihei, No. 11-271722 A (Publication Date: Oct. 8, 1999)

SUMMARY OF THE INVENTION

However, since being electrically isolated, a floating island electrode can absorb only a limited amount of electric charge. Under this circumstance, a case where a large electric charge occurs in a backup wiring may result in a problem such as a breakdown of a protection circuit and a failure in wiring as described above.

The present invention is attained in view of the above problem and an object of the present invention is to provide a liquid crystal panel in which a failure in wiring is less likely to occur even if an undesired large electric charge occurs in a backup wiring due to static electricity or the like.

The liquid crystal panel of the present invention includes: a first substrate on which a switching element, a pixel electrode, a signal line, and a backup wiring for recovering a defect in the signal line are formed; a second substrate being opposed to the first substrate, on which second substrate a common electrode is formed; and a liquid crystal material provided between the first substrate and the second substrate, the backup wiring being electrically connected to the common electrode through a protection circuit for discharging an undesired electric charge that occurs in the backup wiring.

Further, the liquid crystal panel of the present invention including: a first substrate on which a switching element, a pixel electrode, and a signal line are formed; a second substrate being opposed to the first substrate, on which second substrate a common electrode is formed; and a liquid crystal material provided between the first substrate and the second substrate, the liquid crystal panel includes: a backup wiring for recovering a defect in the signal line; and a protection circuit for electrically connecting the backup wiring to the common electrode when a potential of the backup wiring exceeds a threshold value.

In this configuration, if an undesired large electric charge occurs in the backup wiring due to static electricity or the like, the backup wiring will be electrically connected to the common electrode on the second substrate through the protection circuit. Accordingly, the electric charge can be discharged to the common electrode. This makes it possible to reduce problems (for example, unexpected short-circuiting of the backup wiring and the signal line) caused by the undesired electric charge that occurs in the backup wiring.

The liquid crystal panel of the present invention is preferably configured such that the protection circuit is provided on the first substrate; the first substrate and the second substrate are bonded with a sealing adhesive containing a conductive body, and the conductive body is electrically connected to the protection circuit and to the common electrode. This configuration makes it easy to electrically connect the first and second substrates.

The liquid crystal panel of the present invention may be configured such that the protection circuit contains a semiconductor element that allows a current to flow only when a potential of the backup wiring exceeds a threshold value. This configuration makes it possible to easily achieve a protection circuit that (electrically) connects the backup wiring to the common electrode only when an undesired large electric charge occurs in the backup wiring.

The liquid crystal panel of the present invention may be configured such that the first substrate includes a floating island electrode in a nondisplay area; and the floating island electrode is electrically connected to the protection circuit and to the conductive body. This configuration makes it easy to connect the protection circuit and the conductive body that is contained in the sealing adhesive.

The liquid crystal panel of the present invention may be configured such that the first substrate includes a connection electrode in contact with the sealing adhesive; and the sealing adhesive is in contact with the common electrode on the second substrate and the connection electrode is in contact with the floating island electrode.

The liquid crystal panel of the present invention may be configured such that the first substrate includes a plurality of backup wirings formed side by side; the protection circuit includes a plurality of current controlling circuits; two backup wirings adjacent to each other are electrically connected with each other through a current controlling circuit; and one of the two backup wirings provided on an outer side is electrically connected to the common electrode through the current controlling circuit. This configuration makes it possible to connect each of the plurality of backup wirings to the common electrode through the protection circuit.

The liquid crystal panel of the present invention may further include: a plurality of retention capacitor wirings running through a display area; and a major retention capacitor wiring being connected with the plurality of retention capacitor wirings in a nondisplay area, wherein the other one of the two backup wirings provided on the outer side is electrically connected to the major retention capacitor wiring through another current controlling circuit. This configuration makes it possible to provide two pathways (a pathway to the common electrode and a pathway to the major retention capacitor wiring) through which an electric charge is discharged. As a result, an undesired electric charge caused by static electricity or the like can be quickly discharged.

Further, the liquid crystal panel of the present invention may be configured such that each of the plurality of current controlling circuits is formed from a first transistor and a second transistor; and a source of the first transistor, a gate of the first transistor, and a drain of the second transistor are electrically connected to the one backup wiring or the other backup wiring or to the common electrode, whereas a source of the second transistor, a gate of the second transistor, and a drain of the first transistor are electrically connected to the one backup wiring or the other backup wiring or to the major retention capacitor wiring.

It is preferable that the floating island electrode also function as a light-shielding material in the nondisplay area.

Further, it is preferable that the conductive body contained in the sealing adhesive be a bead whose surface is coated with a conductive film.

The liquid crystal panel of the present invention may be configured such that the floating island electrode and the connection electrode are in contact with each other in a contact hole that is formed so as to penetrate through an insulating layer of the first substrate. This configuration makes it easy to connect the protection circuit and the conductive body that is contained in the sealing adhesive. In this case, the backup wiring may be provided in a same layer as a scanning signal line which is one of the signal lines, and the connection electrode may be formed in a same layer as the pixel electrode. This configuration makes it possible to form the scanning signal line and the backup wiring in one process concurrently. Further, the pixel electrode and the connection electrode can be formed in one process concurrently.

The liquid crystal panel of the present invention may be configured such that the first substrate is an active matrix substrate, and the second substrate is a color filter substrate.

The liquid crystal display apparatus of the present invention includes the liquid crystal panel as described above.

The television receiver of the present invention includes: the liquid crystal display apparatus as set forth above; and a tuner section for receiving television broadcast.

As described above, in the liquid crystal panel of the present invention, if an undesired large electric charge occurs in the backup wiring due to static electricity or the like, the backup wiring will be electrically connected to the common electrode on the second substrate through the protection circuit. Consequently, the electric charge can be discharged to the common electrode. This makes it possible to reduce problems (for example, unexpected short-circuiting of the backup wiring and the signal line) caused by the undesired electric charge that occurs in the backup wiring.

BRIEF DESCRIPTION OF DRAWINGS

FIG. 1

FIG. 2

FIG. 3

FIG. 4

FIG. 5

FIG. 6

FIG. 7

FIG. 8

FIG. 9

FIG. 10

REFERENCE SIGNS LIST

3 Active Matrix Substrate (First Substrate)
6 Sealing Adhesive
7 Major Retention Capacitor Wiring
8a, 8b Backup Wirings
9 Protection Circuit
9a through 9c Current Controlling Circuits
10 Liquid Crystal Panel
11 Floating Island Electrode
12 TFT (Switching Element)

15 Data Signal Line (Signal Line)
16 Scanning Signal Line (Signal Line)
17 Pixel Electrode
18 Retention Capacitor Wiring
20 Liquid Crystal Display Apparatus
28 Conductive Bead (Conductive Body)
30 Color Filter Substrate (Second Substrate)
40 Liquid Crystal Material
44 Display Area
55 Nondisplay Area
80 Television Receiver
T1 Transistor (First Transistor)
T2 Transistor (Second Transistor)

DESCRIPTION OF EMBODIMENTS

One embodiment of the present invention is described below with reference to FIGS. 1 to 8.

Figure 1:
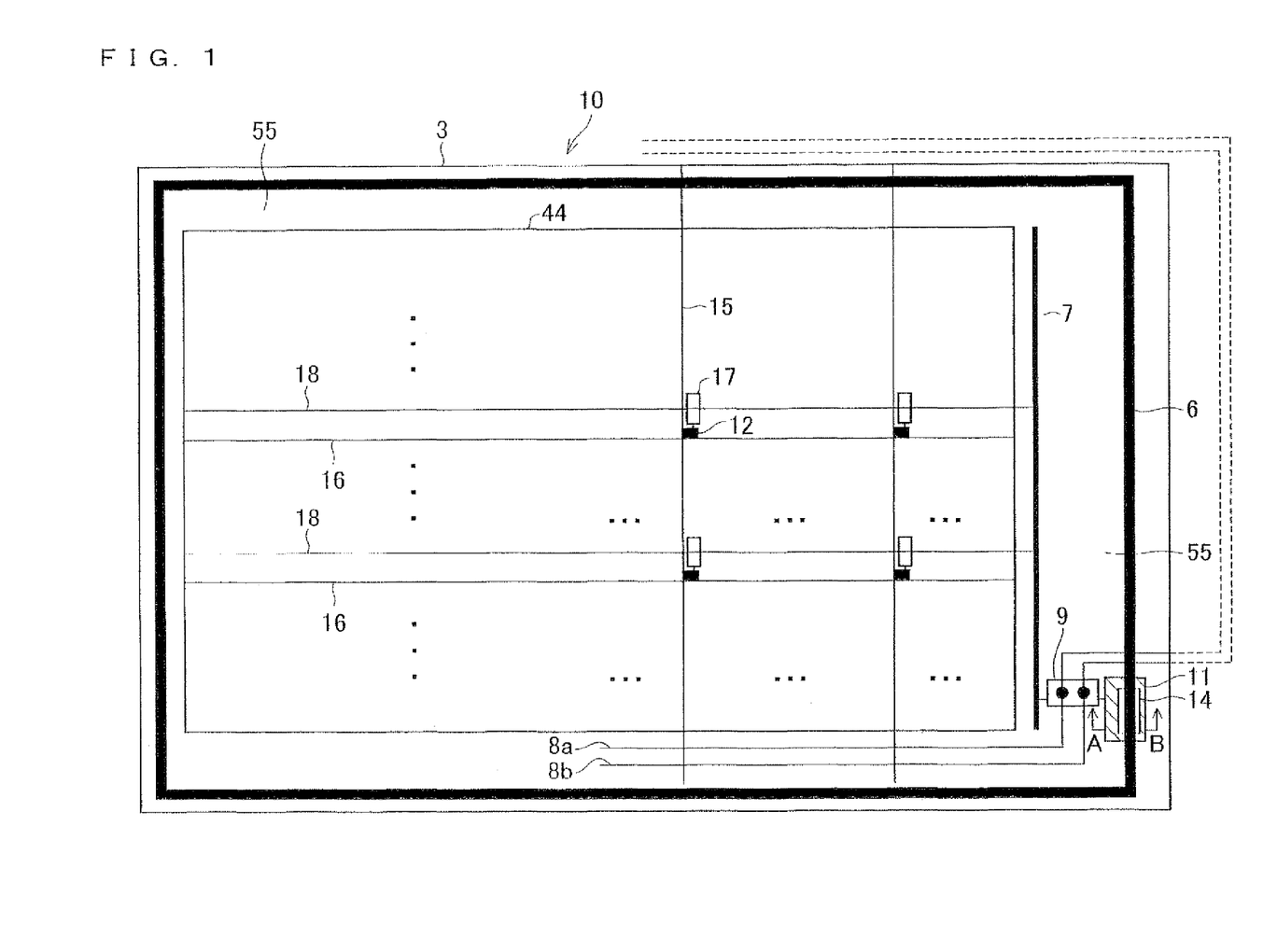
FIG. 1 is a see-through plan view illustrating a configuration of a liquid crystal panel according to the present embodiment.
Figure 2:
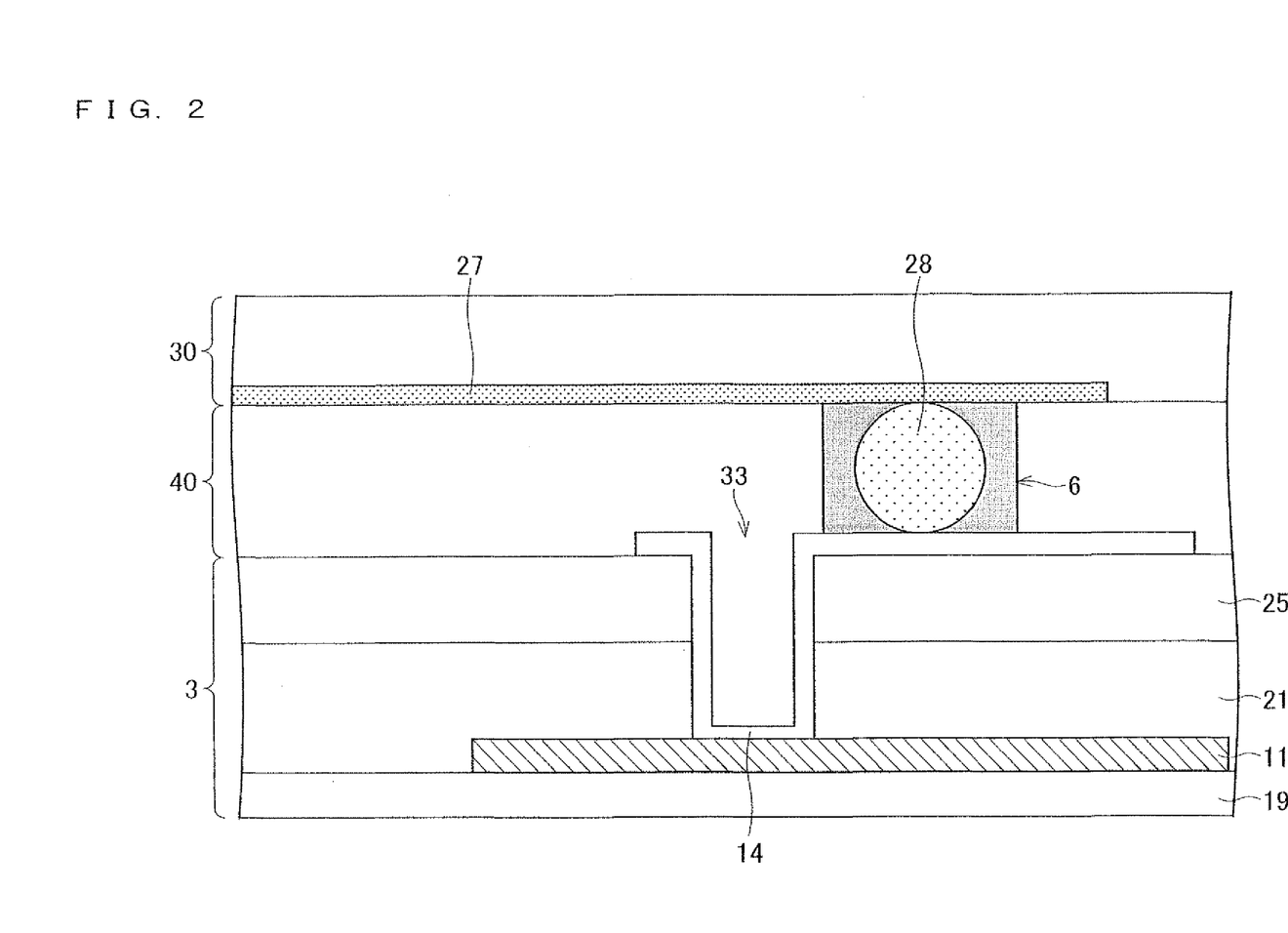
FIG. 2 is a cross-sectional view illustrating a nondisplay area of the liquid crystal panel of FIG. 1.

FIG. 1 is a plan view illustrating a configuration of a liquid crystal panel of the present invention. FIG. 2 is a cross-sectional view taken along a line A-B in FIG. 1.

As shown in FIGS. 1 and 2, the liquid crystal panel 10 includes: an active matrix substrate 3; a color filter substrate 30; a liquid crystal material 40 provided between the active matrix substrate 3 and the color filter substrate 30; and a sealing adhesive 6 for bonding the active matrix substrate 3 and the color filter substrate 30 as well as sealing in the liquid crystal material 40 between the active matrix substrate 3 and the color filter substrate 30.

The active matrix substrate 3 includes: a plurality of scanning signal lines 16 and a plurality of data signal lines 15 which are arranged crisscross; a TFT 12 (switching element) formed in the vicinity of each intersection of the signal lines (15, 16); and pixel electrodes 17. The TFT 12 has: a gate electrode that is connected to the scanning signal line 16; a source electrode that is connected to the data signal line 15; and a drain electrode that is connected to the pixel electrode 17.

The color filter substrate 30 includes: a colored layer which is not illustrated; a common electrode (counter electrode, not illustrated) provided in a display area so as to be opposed to the pixel electrode 17 via the liquid crystal material 40; and a common electrode 27 provided in a nondisplay area (refer to FIG. 2) so as to be electrically connected to the common electrode in the display area. These common electrodes are supplied with common potential. This common potential is kept substantially at a constant level.

In the liquid crystal panel 10, a data signal (signal potential) having been transferred to the data signal line 15 is written to the pixel electrode 17 through the TFT 12. This causes a potential difference between the pixel electrode 17 and the common electrode in the display area (the common electrode formed on the color filter substrate 30). This potential difference controls an optical transmittance of the liquid crystal material 40.

A retention capacitor wiring (Cs wiring) 18 has such functions as (i) preventing self-discharge of the liquid crystal material 40 or providing each pixel with a modulation signal during an OFF period of the TFT 12. The retention capacitor wiring 18 is connected to a major retention capacitor wiring 7 in the nondisplay area 55. It should be noted that, in a case where the liquid crystal panel 10 employs a divided-pixel system (that controls a plurality of subpixels provided in one pixel so that each of the plurality of subpixels has a different luminance from one another and that performs halftone display according to area coverage modulation of the subpixels each having a different luminance), the retention capacitor wiring 18 is supplied with a Cs signal. The retention capacitor wirings 18 having the same Cs signal phase are connected to the same major retention capacitor wiring 7. In the divided-pixel system, one pixel is provided with a plurality of pixel electrodes 17, each of which individually forms the retention capacitor wiring 18 and a retention capacitor.

Figure 7:
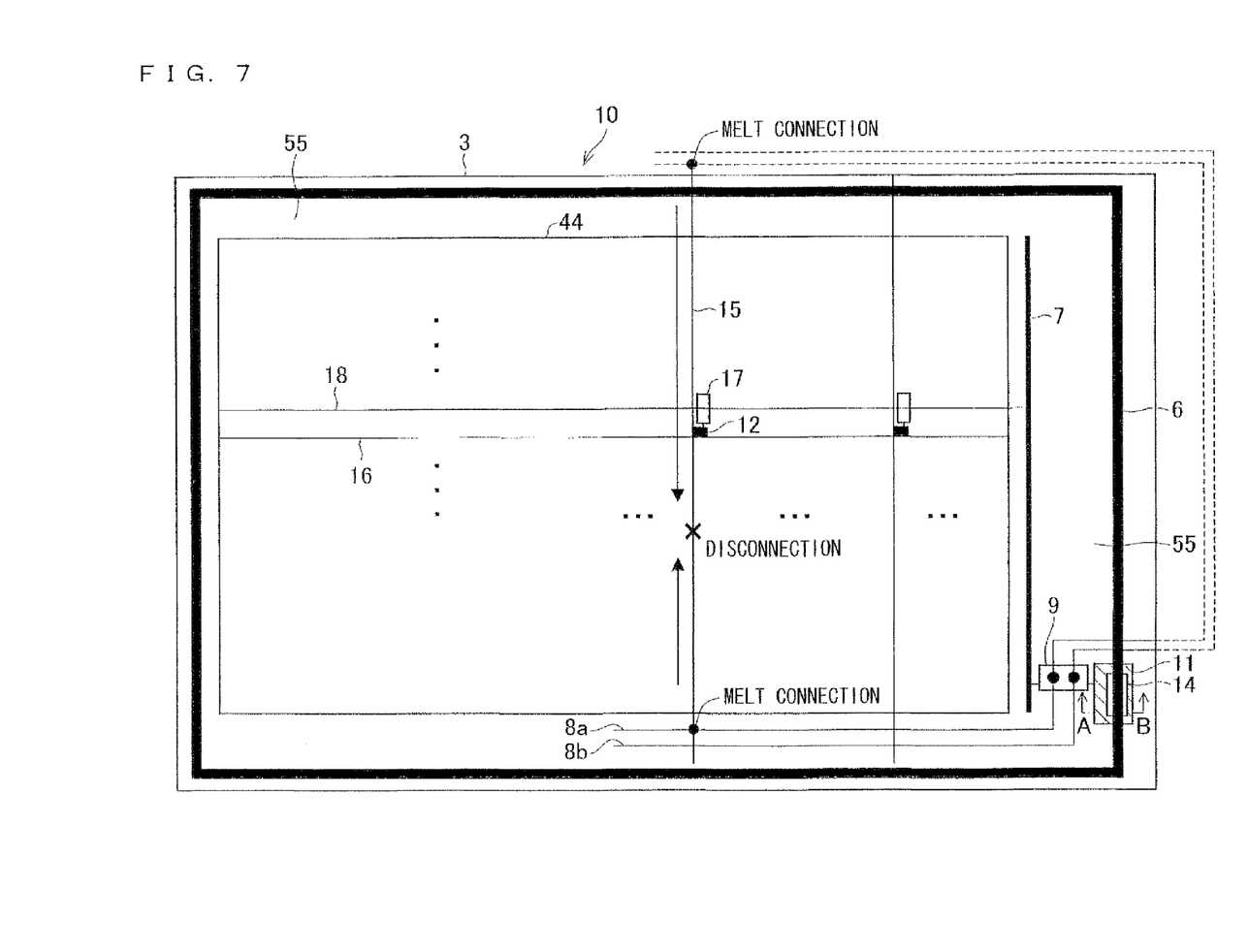
FIG. 7 is a plan view illustrating how a data signal line is recovered in the liquid crystal panel of the present invention.

As shown in FIG. 1, the backup wirings 8a and 8b run from the non-display area on an inner side of one side (along the scanning signal line 16) that forms an outside edge of the liquid crystal panel 10 and extend up to positions on an outer side of another side (another side along the scanning signal line 16) opposite to the aforesaid one side, through an external substrate or the like. The backup wirings 8a and 8b are used for recovering disconnection or the like of, for example, the data signal line 15. For example, as shown in FIG. 7, in the case where disconnection of the data signal line 15 occurs in the display area, the data signal line 15 is melt-connected to the backup wiring 8a at a preceding point and a subsequent point with respect to a point of the disconnection of the data signal line 15. This makes it possible to supply a signal potential to a section subsequent to the point of disconnection of the data signal line 15.

In the liquid crystal panel 10, each of the backup wirings 8a and 8b is electrically connected through a protection circuit 9 to the major retention capacitor wiring 7 and to the common electrode 27 on the color filter substrate 30 (refer to FIGS. 1 and 2). This configuration is for quickly discharging, outside the backup wirings, an undesired large electric charge that occurs in the backup wirings 8a and 8b due to static electricity or the like. This configuration is described in detail below.

Figure 3:
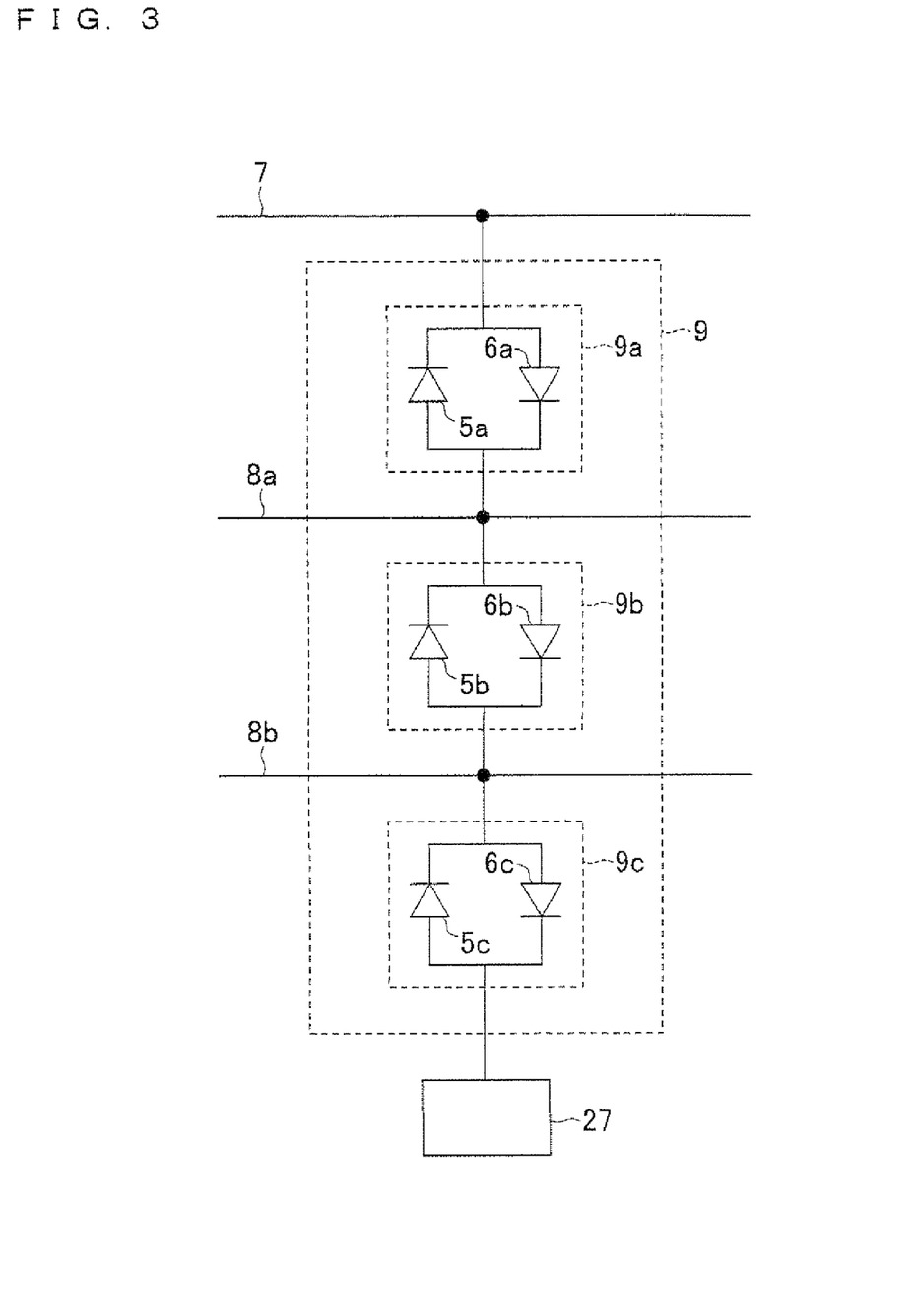
FIG. 3 is a circuit diagram illustrating a configuration of a protection circuit of the liquid crystal panel of the present invention.

As shown in FIG. 3, the protection circuit 9 includes three current controlling circuits (diode rings) 9a to 9c. Each of the current controlling circuits is configured by connecting two diode elements in inverse directions in parallel with each other. That is, the current controlling circuit 9a is configured by connecting diode elements 5a and 6a in inverse directions in parallel with each other. Further, the current controlling circuit 9b is configured by connecting diode elements 5b and 6b in inverse directions in parallel with each other, and the current controlling circuit 9c is configured by connecting diode elements 5c and 6c in inverse directions in parallel with each other.

Then, in the current controlling circuit 9a, a cathode of the diode element 5a and an anode of the diode element 6a are connected to the major retention capacitor wiring 7, whereas an anode of the diode element 5a and a cathode of the diode element 6a are connected to the backup wiring 8a. In the current controlling circuit 9b, a cathode of the diode element 5b and an anode of the diode element 6b are connected to the backup wiring 8a, whereas an anode of the diode element 5b and a cathode of the diode element 6b are connected to the backup wiring 8b. In the current controlling circuit 9c, a cathode of the diode element 5c and an anode of the diode element 6c are connected to the backup wiring 8b, whereas an anode of the diode element 5c and a cathode of the diode element 6c are connected to the common electrode 27 of the color filter substrate 30.

Figure 4:
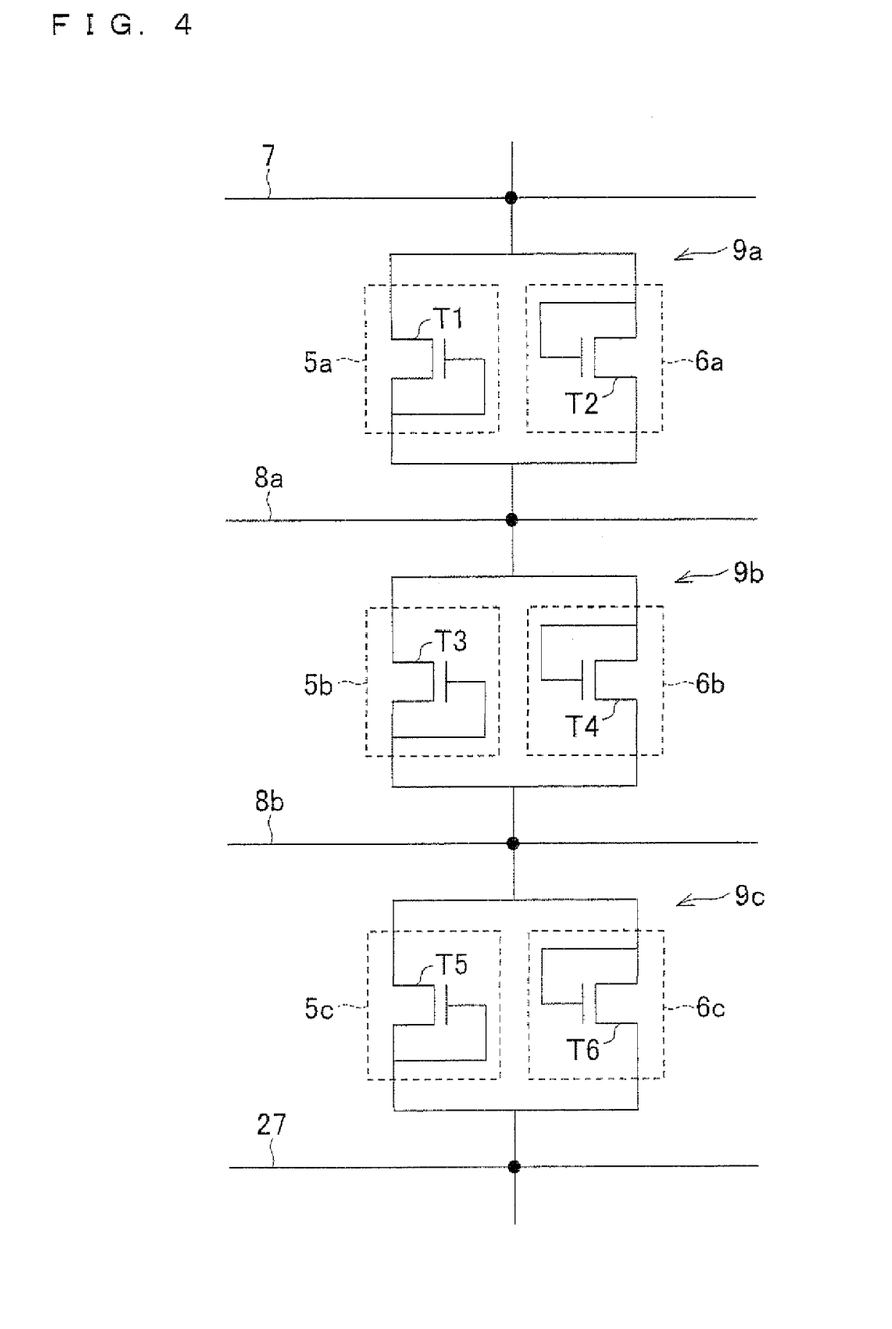
FIG. 4 is a circuit diagram more specifically illustrating the configuration of the protection circuit of FIG. 3.
Figure 5:
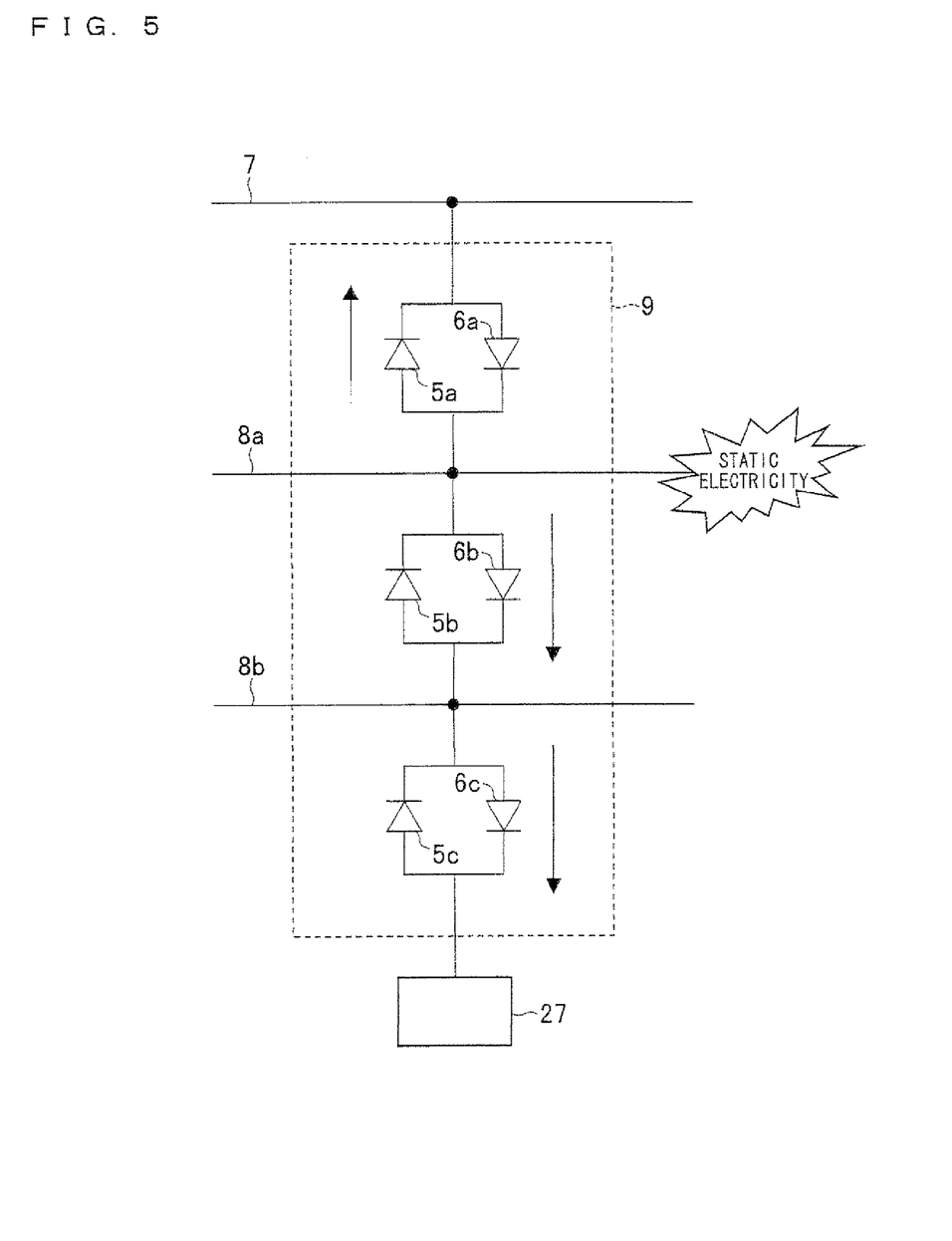
FIG. 5 is a schematic view illustrating a function of the protection circuit of FIG. 3.
Figure 6:
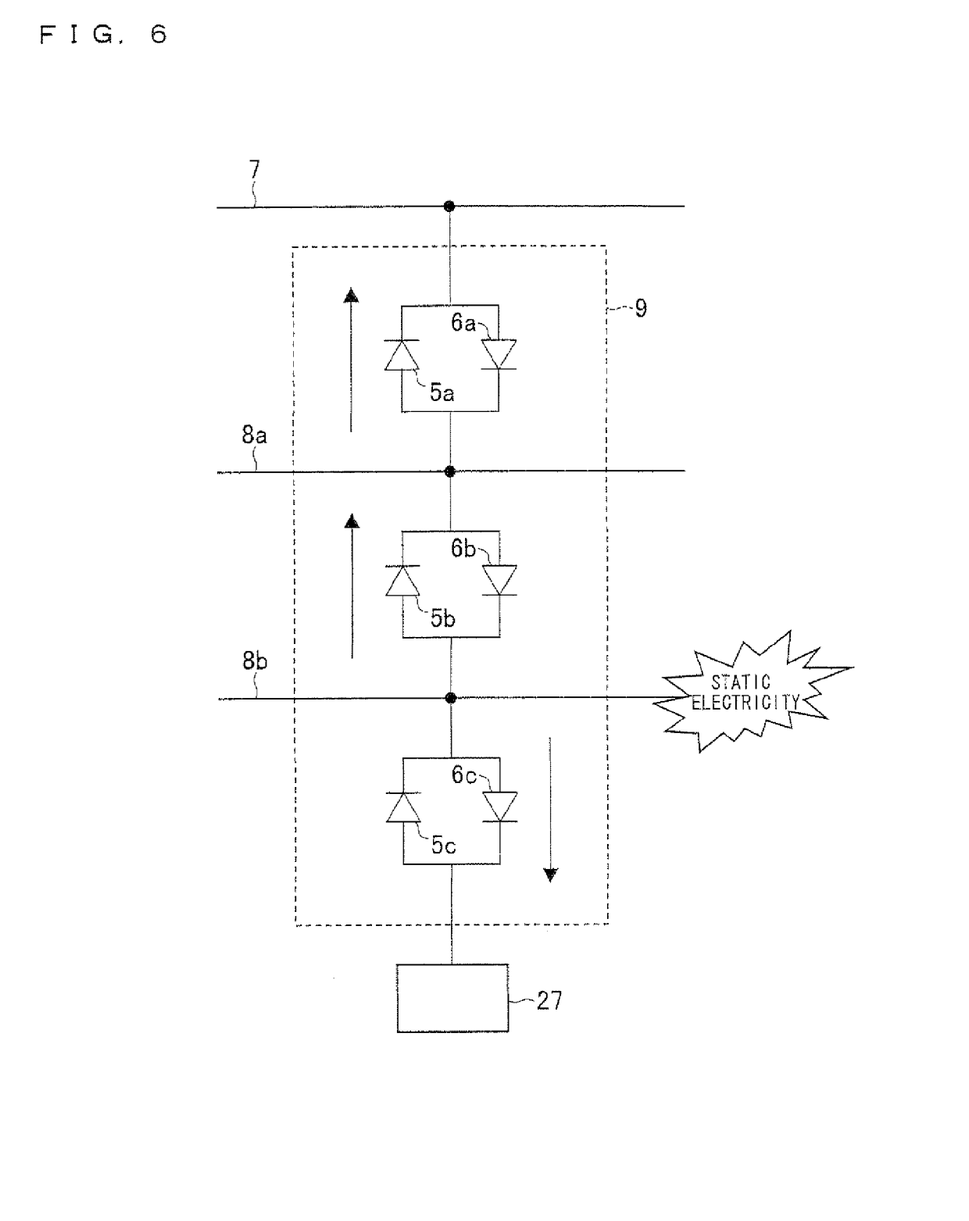
FIG. 6 is another schematic view illustrating the function of the protection circuit of FIG. 3.

FIG. 4 shows one specific example of the current controlling circuits (diode rings) 9a to 9c. As shown in FIG. 4, the diode element 5a is configured such that a source and a gate of a transistor T1 (first transistor) are connected with each other to form the anode, while a drain of the transistor T1 serves as the cathode. The diode element 6a is configured such that a source and a gate of a transistor T2 (second transistor) are connected with each other to form the anode, while a drain of the transistor T2 serves as the cathode. The diode elements 5b and 5c, and the diode elements 6b and 6c are configured in the same manner.

As a result, the source of the transistor T1 (first transistor), the gate of the transistor T1, and the drain of the transistor T2 (second transistor) are connected to the backup wiring 8a, whereas the source of the transistor T2, the gate of the transistor T2, and the drain of the transistor T1 are connected to the major retention capacitor wiring 7. Similarly, a source of a transistor T3 (first transistor), a gate of the transistor T3, and a drain of a transistor T4 (second transistor) are connected to the backup wiring 8b, whereas a source of the transistor T4 (second transistor), a gate of the transistor T4, and a drain of the transistor T3 are connected to the backup wiring 8a. Further, a source of a transistor T5 (first transistor), a gate of the transistor T5, and a drain of a transistor T6 (second transistor) are connected to the common electrode 27, whereas a source of the transistor T6 (second transistor), a gate of the transistor T6, and a drain of the transistor T5 are connected to the backup wiring 8b.

Each of the backup wirings 8a and 8b is connected to the major retention capacitor wiring 7 and to the common electrode 27 through the protection circuit 9 in the above described manner. In this configuration, if a large electric charge occurs in the backup wiring 8a due to static electricity or the like, it is possible to discharge the electric charge to the common electrode 27 through the diode elements 6b and 6c as well as to the major retention capacitor wiring 7 through the diode element 5a (refer to FIG. 5). Similarly, if a large electric charge occurs in the backup wiring 8b due to static electricity or the like, it is possible to discharge the electric charge to the major retention capacitor wiring 7 through the diode elements 5b and 5a as well as to the common electrode 27 through the diode element 6c (refer to FIG. 6).

Now, refer back to FIGS. 1 and 2. The protection circuit 9 is connected to a floating island electrode 11. The floating island electrode 11 is formed as a light blocking metal, in the nondisplay area of the active matrix substrate 3. The floating island electrode 11 is formed in the same layer as the scanning signal line 16. Provided on top of the floating island electrode 1 are a gate insulating film 21 and an interlayer insulating film 25. Further, a connection electrode 14 is formed on top of the interlayer insulating film 25. The connection electrode 14 is an ITO electrode that is formed in the same layer as the pixel electrode 17. This connection electrode 14 is connected with the floating island electrode 11 through a contact hole 33.

In the liquid crystal panel 10 of the present invention, the sealing adhesive 6 contains a conductive bead 28 having a diameter larger than a size of a cell gap. This conductive bead 28 is provided so as to overlap with the connection electrode 14. This allows the connection electrode 14 to be electrically connected to the common electrode 27 on the color filter substrate 30 through the conductive bead 28. More specifically, the sealing adhesive 6 (the conductive bead 28 contained in the sealing adhesive) is in contact with the common electrode 27 on the color filter substrate 30. Further, the connection electrode 14 is in contact with the sealing adhesive 6 (the conductive bead 28 contained in the sealing adhesive) and with the floating island electrode 11. Further, as described above, the common electrode 27 (the common electrode in the nondisplay area) is connected to the common electrode (counter electrode) in the display area. In other words, the backup wirings 8a and 8b are electrically connected to the common electrode in the display area through the floating island electrode 11, the connection electrode 14, the conductive bead 28, and the common electrode 27.

The conductive bead 28 contained in the sealing adhesive 6 may be a bead whose surface is coated with a conductive film (e.g., a film made of gold or carbon).

As described above, according to the liquid crystal panel 10 of the present invention, if an undesired large electric charge occurs in the backup wirings 8a and 8b due to static electricity or the like (if a potential of the backup wirings 8a and 8b exceeds a threshold value of the protection circuit), the backup wirings 8a and 8b are electrically connected, through the protection circuit 9, to the common electrode 27 on the color filter substrate 30 and to the major retention capacitor wiring 7 on the active matrix substrate 3. As a result, it becomes possible to discharge the electric charge to the common electrode 27 and to the major retention capacitor wiring 7. This makes it possible to prevent a failure in wiring (for example, short-circuiting or leak in the backup wiring and the data signal line due to static electricity).

Figure 8:
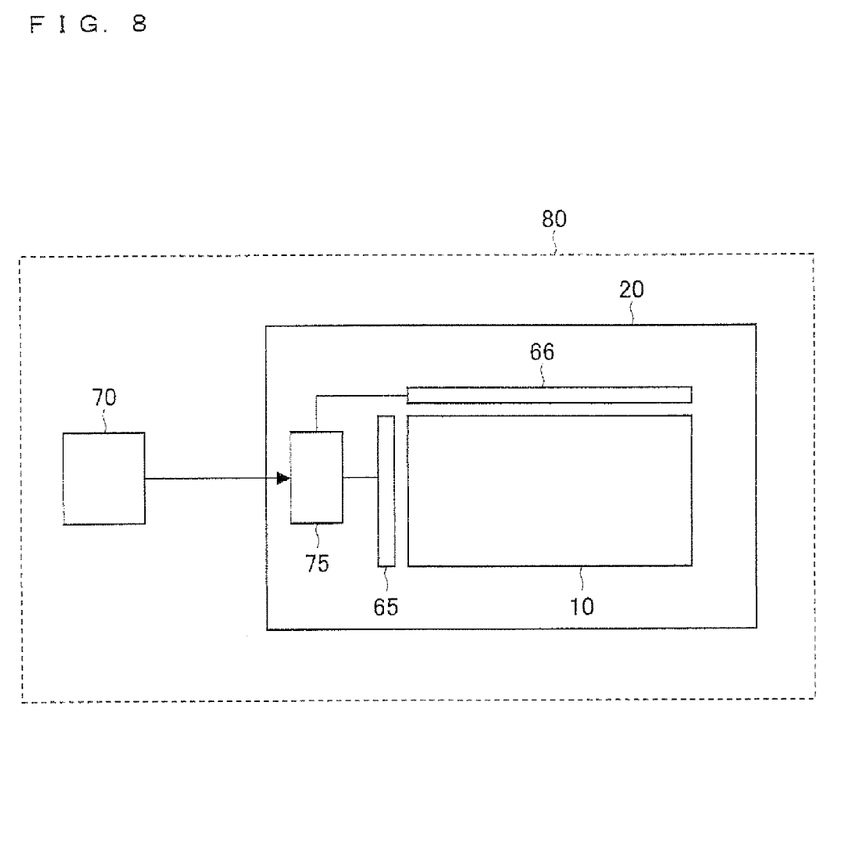
FIG. 8 is a block diagram illustrating a configuration of the liquid crystal television according to the present embodiment.

As shown in FIG. 8, the liquid crystal display apparatus according to the present embodiment includes: the liquid crystal panel 10; a gate driver 65 and a source driver 66 which are for driving the liquid crystal panel 10; and a controlling device 75 for controlling each of the drivers (65, 66). A television receiver (liquid crystal television) 80 according to the present embodiment includes: the liquid crystal display apparatus 20 of the present invention; and a tuner section 70 for receiving television broadcast so as to output a video signal. That is, in the television receiver 80, the liquid crystal display apparatus 20 displays a video picture (image) according to the video signal outputted from the tuner section 70.

The present invention is not limited to the description of the embodiments above, but may be altered within the scope of the claims. An embodiment based on a proper combination of technical means disclosed in different embodiments is encompassed in the technical scope of the invention.

INDUSTRIAL APPLICABILITY

The liquid crystal panel and the liquid crystal display apparatus of the present invention are suitably applicable for, for example, a liquid crystal television.

The invention claimed is:

1. A liquid crystal panel comprising:
   a first substrate on which a switching element, a pixel electrode, a signal line, and a backup wiring for recovering a defect in the signal line are formed;
   a second substrate being opposed to the first substrate, on which second substrate a common electrode is formed; and
   a liquid crystal material provided between the first substrate and the second substrate,
   the backup wiring being electrically connected to both the common electrode and a retention capacitor wiring through a protection circuit for discharging an undesired electric charge that occurs in the backup wiring.

2. The liquid crystal panel according to claim 1, wherein: the protection circuit is provided on the first substrate; the first substrate and the second substrate are bonded with a sealing adhesive containing a conductive body; and the conductive body is electrically connected to the protection circuit and to the common electrode.

3. The liquid crystal panel according to claim 2, wherein: the first substrate includes a floating island electrode in a nondisplay area; and the floating island electrode is electrically connected to the protection circuit and to the conductive body.

4. The liquid crystal panel according to claim 3, wherein the floating island electrode also functions as a light-shielding material in the nondisplay area.

5. The liquid crystal panel according to claim 2, wherein the conductive body is a bead whose surface is coated with a conductive film.

6. The liquid crystal panel according to claim 1, wherein the protection circuit contains a semiconductor element that allows a current to flow only when a potential of the backup wiring exceeds a threshold value.

7. The liquid crystal panel according to claim 1, wherein:
the first substrate includes a plurality of backup wirings formed side by side;
the protection circuit includes a plurality of current controlling circuits;
two backup wirings adjacent to each other are electrically connected with each other through a current controlling circuit; and
one of the two backup wirings provided on an outer side is electrically connected to the common electrode through the current controlling circuit.

8. The liquid crystal panel according to claim 1, wherein the first substrate is an active matrix substrate, and the second substrate is a color filter substrate.

9. A liquid crystal display apparatus comprising a liquid crystal panel as set forth in claim 1.

10. A television receiver comprising:
a liquid crystal display apparatus as set forth in claim 9; and
a tuner section for receiving television broadcast.

11. A liquid crystal panel comprising:
a first substrate on which a switching element, a pixel electrode, a signal line, and a backup wiring for recovering a defect in the signal line are formed;
a second substrate being opposed to the first substrate, on which second substrate a common electrode is formed;
a liquid crystal material provided between the first substrate and the second substrate,
the backup wiring being electrically connected to the common electrode through a protection circuit for discharging an undesired electric charge that occurs in the backup wiring;
the protection circuit is provided on the first substrate;
the first substrate and the second substrate are bonded with a sealing adhesive comprising a conductive body;
the conductive body is electrically connected to the protection circuit and to the common electrode;
the first substrate includes a floating island electrode in a nondisplay area;
the floating island electrode is electrically connected to the protection circuit and to the conductive body;
the first substrate includes a connection electrode in contact with the sealing adhesive; and
the sealing adhesive is in contact with the common electrode on the second substrate and the connection electrode is in contact with the floating island electrode.

12. The liquid crystal panel according to claim 11, wherein the floating island electrode and the connection electrode are in contact with each other in a contact hole.

13. The liquid crystal panel according to claim 12, wherein the backup wiring is provided in a same layer as a scanning signal line which is one of the signal lines, and the connection electrode is formed in a same layer as the pixel electrode.

14. A liquid crystal panel comprising:
a first substrate on which a switching element, a pixel electrode, a signal line, and a backup wiring for recovering a defect in the signal line are formed;
a second substrate being opposed to the first substrate, on which second substrate a common electrode is formed;
a liquid crystal material provided between the first substrate and the second substrate,
the backup wiring being electrically connected to the common electrode through a protection circuit for discharging an undesired electric charge that occurs in the backup wiring;
the first substrate includes a plurality of backup wirings formed side by side;
the protection circuit includes a plurality of current controlling circuits;
two backup wirings adjacent to each other are electrically connected with each other through a current controlling circuit;
one of the two backup wirings provided on an outer side is electrically connected to the common electrode through the current controlling circuit;
a plurality of retention capacitor wirings running through a display area;
a major retention capacitor wiring being connected with the plurality of retention capacitor wirings in a nondisplay area,
wherein the other one of the two backup wirings provided on the outer side is electrically connected to the major retention capacitor wiring through another current controlling circuit.

15. A liquid crystal panel according to claim 14, wherein:
each of the plurality of current controlling circuits is formed from a first transistor and a second transistor, and
a source of the first transistor, a gate of the first transistor, and a drain of the second transistor are electrically connected to the one backup wiring or the other backup wiring or to the common electrode, whereas a source of the second transistor, a gate of the second transistor, and a drain of the first transistor are electrically connected to the one backup wiring or the other backup wiring or to the major retention capacitor wiring.

16. A liquid crystal panel comprising:
a first substrate on which a switching element, a pixel electrode, and a signal line are formed; a second substrate being opposed to the first substrate, on which second substrate a common electrode is formed; and a liquid crystal material provided between the first substrate and the second substrate, the liquid crystal panel comprising:
a backup wiring for recovering a defect in the signal line;
a protection circuit for electrically connecting the backup wiring to the common electrode when a potential of the backup wiring exceeds a threshold value; and
wherein the backup wiring is electrically connected to both the common electrode and a retention capacitor wiring through at least the protection circuit.

17. A liquid crystal panel including: a first substrate on which a switching element, a pixel electrode, and a signal line are formed; a second substrate being opposed to the first substrate, on which second substrate a common electrode is formed; and a liquid crystal material provided between the first substrate and the second substrate, the liquid crystal panel further comprising:
a backup wiring for recovering a defect in the signal line;
a protection circuit for electrically connecting the backup wiring to the common electrode when a potential of the backup wiring exceeds a threshold value;
a plurality of retention capacitor wirings formed on the first substrate;
a major retention capacitor wiring being connected with the plurality of retention capacitor wirings,
the protection circuit electrically connecting the backup wiring also to the major retention capacitor wiring when the potential of the backup wiring exceeds the threshold value.

* * * * *